US012777042B2

(12) United States Patent
Bamford

(10) Patent No.: US 12,777,042 B2
(45) Date of Patent: Oct. 27, 2026

(54) DYNAMIC INGRESS PACKET FILTER

(71) Applicant: Level 3 Communications, LLC, Broomfield, CO (US)

(72) Inventor: Stewart Bamford, Cambridgeshire (GB)

(73) Assignee: Level 3 Communications, LLC, Denver, CO (US)

( * ) Notice: Subject to any disclaimer, the term of this patent is extended or adjusted under 35 U.S.C. 154(b) by 442 days.

(21) Appl. No.: 18/312,291

(22) Filed: May 4, 2023

(65) Prior Publication Data

US 2024/0031369 A1 Jan. 25, 2024

Related U.S. Application Data

(60) Provisional application No. 63/369,331, filed on Jul. 25, 2022.

(51) Int. Cl.
*H04L 9/40* (2022.01)

(52) U.S. Cl.
CPC ........ *H04L 63/101* (2013.01); *H04L 63/1441* (2013.01)

(58) Field of Classification Search
CPC .......................... H04L 63/101; H04L 63/1441
See application file for complete search history.

(56) References Cited

U.S. PATENT DOCUMENTS

| | | | | |
|---|---|---|---|---|
| 2004/0160903 A1* | 8/2004 | Gai | H04L 63/105 | 370/254 |
| 2004/0193906 A1* | 9/2004 | Dar | H04L 63/101 | 726/13 |
| 2006/0106750 A1* | 5/2006 | Smith | H04L 45/52 | |
| 2006/0117058 A1* | 6/2006 | Smith | H04L 63/105 | 707/999.102 |
| 2014/0181953 A1* | 6/2014 | Smith | H04L 45/52 | 726/13 |
| 2016/0308831 A1* | 10/2016 | Smith | H04L 69/22 | |

(Continued)

OTHER PUBLICATIONS

"BCP38 is RFC2827: Network Ingress Filtering: Defeating Denial of Service Attacks which employ IP Source Address Spoofing", www.bcp38.info/index.pho/Main_Page; retrieved May 9, 2023, 4 pgs.

(Continued)

*Primary Examiner* — Yonas A Bayou

(57) ABSTRACT

Systems and methods are provided for generating a network ingress filter based on both a customer's route object and recent traffic data for the customer. In examples, even though a customer of a provider network may have many routing prefixes in its route object, the customer may genuinely generate traffic from only a very small percentage of such prefixes. Accordingly, a combination of a system to generate all the prefixes based on a route object, along with the results of collected traffic data, may be used to generate a much smaller ingress filter. In examples, this filter may comprise an intersection of the prefixes generated by the customer's route object and the prefixes that have been actively generating traffic on the inbound interface of the router (or other provider edge system). This results in a smaller ingress filter that can be reliably configured on the provider edge system.

20 Claims, 5 Drawing Sheets

(56) References Cited

U.S. PATENT DOCUMENTS

2021/0289004 A1* 9/2021 J S ...................... H04L 63/0236
2021/0385151 A1 12/2021 Bamford

OTHER PUBLICATIONS

"Information on BCP 84 >>RFC Editor", https://www.rfc-editor.org/info/bcp84; retrieved May 9, 2023, 2 pgs.
Baker, F. et al., "Ingress Filtering for Multihomed Networks", Best Current Practice; Mar. 2004, 16 pgs.
Ferguson, P. et al., "Network Ingress Filtering: Defeating Denial of Service Attacks which employ IP Source Address Spoofing", Best Current Practice; https://datatracker.ietforg/doc/html/rfc2827.html, May 2000, 10 pgs.
Sriram, K. et al., "RFC 8704: Enhanced Feasible-Path Unicast Reverse Path Forwarding", *Internet Engineering Task Force* Feb. 2020 , pp. 1-17.

* cited by examiner

DYNAMIC INGRESS PACKET FILTER

CROSS-REFERENCE TO RELATED APPLICATIONS

This application claims the benefit of U.S. Provisional Application No. 63/369,331 filed Jul. 25, 2022, entitled "Dynamic Ingress Packet Filter," which is incorporated herein by reference in its entirety.

BACKGROUND

Packet spoofing involves IP packets that are sent with a fake source address, usually intended to cause harm directly or indirectly to a "victim" often as part of a distributed denial of service (DDoS) attack. Existing anti-spoofing methods, however, can be inefficient and/or ineffective. It is with respect to this general technical environment that aspects of the present disclosure are directed.

SUMMARY

In non-exclusive aspects, the present application describes a method comprising: receiving route object information; determining, from the route object information, a first set of permitted source-address prefixes for a customer; receiving traffic data for packets of network traffic received for the customer at a first provider edge system; determining a second set of source-address prefixes from the received traffic data; determining a third set of source-address prefixes that are in both the first set and the second set; generating an access control list based on the third set of source-address prefixes; and causing the access control list to be applied at the first provider edge system.

In another aspect, the present application describes a system comprising at least one processor and memory, operatively connected to the at least one processor and storing instructions that, when executed by the at least one processor, cause the system to perform a method. In examples, the method comprises: receiving route object information; determining, from the route object information, a first set of permitted source-address prefixes for a customer; receiving traffic data for packets of network traffic received for the customer at a first provider edge system; determining a second set of source-address prefixes from the received traffic data; determining a third set of source-address prefixes that are in both the first set and the second set; generating an access control list based on the third set of source-address prefixes; and causing the access control list to be applied at the first provider edge system.

In another aspect, the present application describes a system comprising at least one processor and memory, operatively connected to the at least one processor and storing instructions that, when executed by the at least one processor, cause the system to perform a method. In examples, the method comprises: receiving route object information; determining, from the route object information, a first set of permitted source-address prefixes for a customer; receiving traffic data for packets of network traffic received for the customer at a first provider edge system; determining a second set of source-address prefixes from the received traffic data; determining a third set of source-address prefixes that are in both the first set and the second set; generating a first access control list based on the third set of source-address prefixes; causing the first access control list to be applied at the first provider edge system; receiving second traffic data for packets of network traffic received at a second provider edge system for the customer; determining a fourth set of source-address prefixes from the received second traffic data; determining a fifth set of source-address prefixes that are in both the first set and the fourth set; generating a second access control list based on the fifth set of source-address prefixes; and causing the second access control list to be applied at the second provider edge system.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

DETAILED DESCRIPTION

Figure 1:
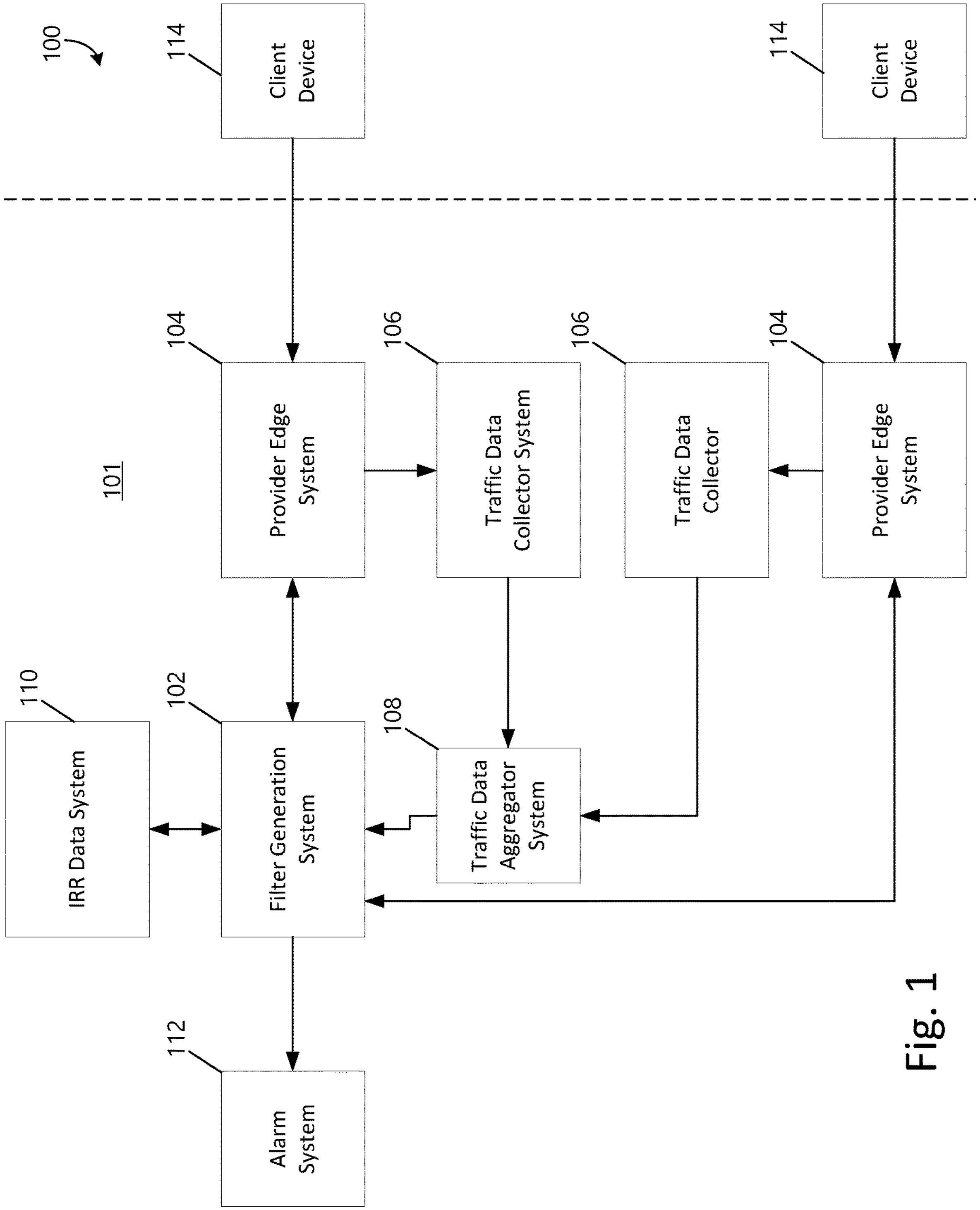
FIG. 1 depicts a block diagram representative of a system in which aspects of the present application may be practiced.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Examples may be practiced as methods, systems or devices. Accordingly, examples may take the form of a hardware implementation, an entirely software implementation, or an implementation combining software and hardware aspects. In addition, all systems described with respect to the Figures can comprise one or more machines or devices that are operatively connected to cooperate in order to provide the described system functionality. The following detailed description is therefore not to be taken in a limiting sense, and the scope of the present disclosure is defined by the appended claims and their equivalents.

Spoofed packets are a problem on the Internet. Some working groups, such as the Internet engineering task force (IETF) have suggested particular "best current practices" (BCPs) with respect to spoofed packets. For example, BCP38 (RFC2827) and BCP84 (RFC3704) recommend anti-spoofing with the use of reverse path forwarding and/or ingress filtering at ingress routers and gateways. Reverse path forwarding is a technique used in routing devices to prevent IP address spoofing in unicast routing. For example, packets may be blocked on an interface unless they come from a valid route to the source of a packet. In examples, unicast Reverse Path Forwarding (RPF) can be loose, which makes it of limited utility because it checks for any valid route regardless of ingress interface. RPF can also be strict—each incoming packet is tested against the router's forwarding information base, and if the incoming interface is not the best reverse path, the packet is discarded. This may cause more problems than it fixes because it does not function correctly with multihomed customers with any form of border gateway protocol (BGP) asymmetry. Another previously suggested solution is a concept of "feasible path" checking for RPF, but feasible path checking still does not resolve all asymmetric BGP issues, and it is not supported by all router vendors. RPF also often creates an extra load on the ingress processing element of routers and, therefore, can result in a significant performance impact.

Ingress filters, also known as access control lists (ACLs), are another sometimes recommended method of combatting spoofed packets. Using filters already generated for BGP prefix filtering, an ACL may be placed on an interface of a provider edge system, such as a router, a switch, a gateway, etc. As used herein, an "interface" may comprise a physical port on the provider edge system, a logical interface (such as a virtual local area network (VLAN) interface), or a combination thereof. In examples, the interface defined for a provider network may be specific to a particular customer of the provider network.

In examples discussed herein, the ingress filter allows through only packets from a source address that is contained within a route object of a provider-network customer, such as an Internet routing registry (IRR) route object. Automated systems generate BGP-prefix lists based on the customer route object, and they can be used to generate an ingress filter term to allow only packets with a source address included in the customer's route object.

In examples, one issue with this technique may be that many customers of Internet service providers (ISPs) have a route object that results in an enormous prefix list, which would correspondingly result in an enormous ingress filter. Many modern routers (or other provider edge systems) have limits on how large these filters can be, and often the limit is just a few thousand lines of filter. By contrast, some customers' route objects may actually generate tens of thousands on lines of filter. Trying to configure and use a larger filter than a router (or other provider edge system) can accommodate may result in unexpected service outages, as router elements fail in a network.

However, in examples, even though a customer of a provider network may have tens of thousands, if not hundreds of thousands, of lines of filter code based on its route object, the customer may genuinely generate traffic only from a very small percentage of that number of prefixes. Accordingly, present systems and methods may use a combination of a system to generate all the prefixes based on a route object, along with the results of collected traffic data (such as NetFlow/cflowd/etc.), to generate a much smaller ingress filter. In examples, this filter may comprise an intersection of the prefixes generated by the customer's route object and the prefixes that have been actively generating traffic on the inbound interface of the router (or other provider edge system). In examples, this results in a much smaller ingress filter that can be configured on the provider edge system, such as a router (or a filter device associated with the router).

In examples, the ingress filter may be generated on the router itself or, in examples, calculated offline by a separate system that automatically configures the router (or a device associated with the router) on a periodic basis. In examples, the ingress filter may use a modern automation method, such as provided by Netconf. In examples a "maximum filter size" may be a configurable option. For example, the maximum filter size might be set on a per-router (or per-router-type) basis, which means that if the filter becomes too big for the router to handle, an alert may be raised with the network operator and either an incomplete or empty filter may be temporarily pushed to the router to limit any service impact.

By combining the results of a prefix list generated by a customer routing object along with live or recent traffic data actually received by the customer, a much shorter ingress packet filter may be generated to effectively and efficiently deny spoofed packets. The process to do this may be ongoing, allowing for a dynamic ingress packet filter based on the most recent ingress traffic flows.

Examples of the present disclosure may be discussed in relation to the example system 100 of FIG. 1. In examples, a filter generation system 102 is communicatively coupled to provider edge system(s) 104. In the illustrated example, each provider edge system 104 is communicatively coupled with, or includes, a traffic data collector system 106, each of which, in turn, is communicatively coupled to a traffic data aggregator system 108. Filter generation system 102 is also communicatively coupled to an IRR data system 110 and an alarm system 112. In examples, the provider edge system(s), traffic data collector system(s) 106, traffic aggregator system 108, filter generation system 102, IRR data system 110, and alarm system 112 may comprise part of a provider network 101. Further, each of the provider edge systems 104 are communicatively coupled to at least one client device 114. It should be appreciated that one or more of the elements of system 100 may be combined or rearranged without departing from the scope of the present disclosure. Example operations of the system 100 are described below.

Figure 2:
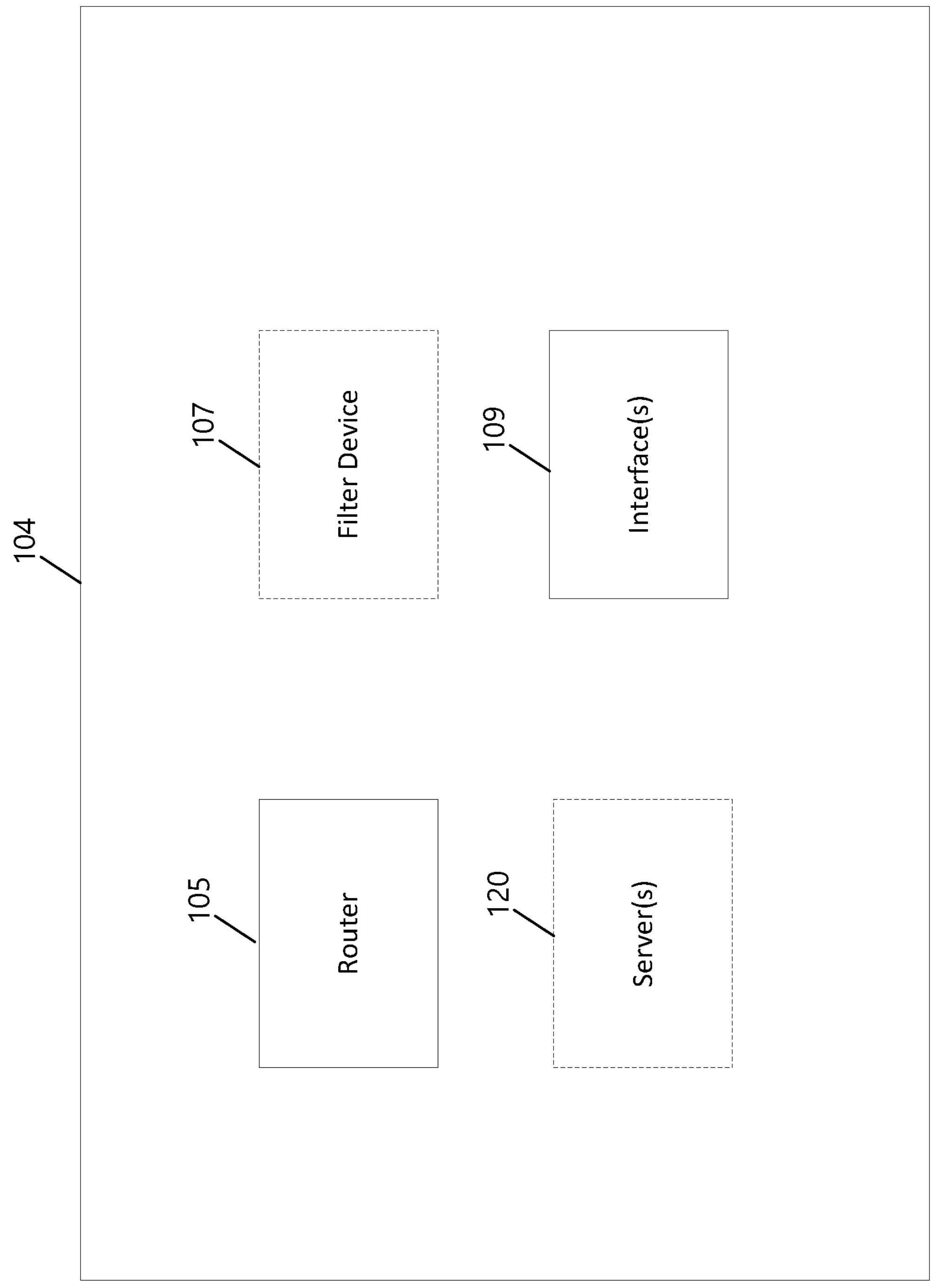
FIG. 2 depicts another block diagram representative of a system in which aspects of the present application may be practiced.

In examples, provider edge systems 104 are configured to receive packets from client devices 114. One example of a provider edge system 104 is shown in FIG. 2. For example, the provider edge system may comprise a router 105, a filter device 107, and interface(s) 109. In examples, the router 105, filter device 107, and interface(s) 109 may be combined or separated in one or more computing devices. For example, the filter device 107 may, in some examples, be a separate computing device that is configured in front of the router 105, so that router 105 receives only packets that make it through filter device 107. In other examples, the filter device 107 may be part of router 105. Interface(s) 109 may comprise a physical port on the provider edge system 104 (e.g., one of filter device 107 and/or router 105), a logical interface (such as a virtual local area network (VLAN) interface), or a combination thereof. In examples, provider edge system 104 and/or router 105 may comprise a routing system as described in U.S. Published Patent Application No. 2021-0385151, which is incorporated by reference herein for all that it teaches.

In examples, the provider edge system(s) 104 route data packets received from client device(s) 114 to one or more other system(s). For example, provider edge system(s) 104 may be configured at the edge(s) (ingress/egress point(s)) of a network 101, and provider edge system(s) 104 may route data packets received from client device(s) 114 to one or more servers or other device(s) (not shown) connected to the network 101. In other examples, the provider edge system(s) 104 may include one or more server(s) 120 to which traffic to/from the client device(s) 114 is routed.

In examples, traffic data is collected for packets of network traffic received by provider edge system(s). For example, one or more of the systems of the provider edge system(s) 104 (such as router 105, filter device 107, server 120 (or other potential network edge device(s), e.g., switches(s), may be configured to collect and export statistics and other information about IP packets. Where the provider edge system(s) 104 are configured to participate in the NetFlow protocol, for example, the provider edge system(s) may be configured with a software agent known as a NetFlow exporter that tracks statistics and other information about IP packet flows and generates flow records that are encapsulated in a user datagram protocol (UDP) message and sent to a flow collector, such as traffic data collector system(s) 106.

Traffic data collector system(s) 106 may each comprise one or more device(s) and/or application(s) communicatively coupled to, or incorporated within, the provider edge system(s) 104. The traffic data collector system(s) 106 may comprise a NetFlow collector application that is responsible for receiving flow record packet(s) from NetFlow exporter(s). Traffic data collector system(s) 106 may also be configured to unpack binary flow data into text/numerical formats, perform data volume reduction through selective filtering and aggregation, and store resulting data in flat files or a database, such as an SQL database.

The traffic data collector system(s) 106 may also configured to forward processed (or raw) traffic data to traffic data aggregator system 108. The traffic data aggregator system 108 may, in examples, operate as a NetFlow analyzer, which may comprise one or more device and/or application that receives traffic data processed by the traffic data collector system(s) 106 and synchronizes and aggregates such processed traffic data. In examples, the traffic data may be identifiable on a per-customer basis. For example, the network 101 may host traffic for multiple customers, but traffic data may, in examples, be correlated to a particular customer based on the interface(s) 109 used to transceive the data by the provider edge system 104.

Although examples herein are described with respect to the NetFlow protocol, other traffic data collection/analysis protocols and mechanisms may be used to identify traffic transceived by the provider edge system(s) 104.

In examples, the IRR data system 110 may comprise one or more databases where routing policies and routing announcements of network 101 are published. The IRR data system 110 may be maintained by the operator of network 101 or may be separately maintained. The IRR data system 110 stores IRR objects for one or more customer(s) of the network 101. For example, each customer of network 101 may publish its own IRR for that customer and cause it to be stored at IRR data system 110. The IRR object for a customer may include prefixes of permitted source IP addresses for that customer, among other information.

In examples, the filter generation system 102 may receive route object information for customers from the IRR data system 110. For example, the filter generation system 102 may receive the IRR objects for customers of network 101 (or may receive prefixes of permitted source IP addresses extracted from such IRR objects) from IRR data system 110. In examples, the filter generation system 102 may use route object information and traffic information in order to generate one or more filter(s) to be applied at the provider edge system(s) for customers of network 101.

For example, a route object may be maintained for a particular customer of network 101 at IRR data system 110. The route object may include a list of permitted IP address prefixes for that customer. The filter generation system 102 may extract from the route object (or receive information extracted from the route object that comprises) a first set of permitted source-address prefixes.

In some examples, first set of permitted source-address prefixes may be extremely large, such as tens of thousands of prefixes. As such, an ingress filter that lists all of the prefixes in the particular customer's route object may comprise tens of thousands of lines of filter. In examples, routers (such as router(s) 105) or other filter device(s) 107, may be limited to implementing just a few thousand lines of filter. Accordingly, the filter generation system 102 may generate a filter for the particular customer that includes only IP address prefixes that appear both in (a) the first set of permitted source-address prefixes (as derived from the route object for the particular customer) and (b) a second set of source address prefixes derived from traffic data for the particular customer.

In examples, traffic data may be collected from provider edge system(s) 104 for the particular customer by traffic data collector system(s) 106 and/or traffic data aggregator system(s) 108. The traffic data may include, among other things, source IP addresses, including source-address prefixes, for packets incoming to provider edge system(s) 104. In examples, the filter generation system 102 may receive, from traffic data aggregator system 108, the second set of source IP address prefixes that appear in traffic for the particular customer received at provider edge system(s) 104. In other examples, the filter generation system 102 may extract the second set of source-address prefixes that appear in traffic for the particular customer from traffic data provided by the traffic data aggregator system 108.

In examples, the traffic data for packets received at provider edge system(s) 104 may be identified as being for the particular customer based on being received on an interface 109 specific to the particular customer. Further, in examples, the filter generation system 102 may identify (or receive traffic data identifying) traffic from particular source-address prefixes as having been received at particular one of the provider edge system(s) 104. This may be useful if it is desired, for example, to implement multiple different filters for the same customer on different provider edge system(s) 104. In other cases, the second set of source-address prefixes may be combined for all traffic received for a particular customer, regardless of which provider edge system 104 received the traffic.

In examples, the second set of source-address prefixes from the traffic data for the particular customer may be time-limited. For example, only source-address prefixes for traffic data received by a provider edge system 104 within a preset period of time (e.g., the last hour, the last day, the last week, the last month, etc.) may be used in deriving the second set of source-address prefixes. In other examples, the second set of source-address prefixes from the traffic data for the particular customer may be space-limited (e.g., only a certain number of source-address prefixes may be stored in the second set, and source-address prefixes from older traffic are ignored). In other examples, the second set of source-address prefixes is not space-limited, and any size constraints to an eventual access control list are applied at a later stage.

In examples, the filter generation system 102 generates one or more filter(s) for the particular customer based on an intersection of the first set of source-address prefixes and the second set of source-address prefixes. For example, the filter generation system 102 may compare the first set of source-address prefixes and the second set of source-address prefixes and produce a third set of source-address prefixes that appear in both of the first set and the second set. The filter generation system 102 may then generate, e.g., an access control list based on the third set of source-address prefixes, and distribute the access control list to provider edge system(s) 104 for application as an ingress filter. In examples, the router 105, filter device 107, or one or more other component(s) of provider edge system(s) 104 may apply the access control list to filter traffic for the particular customer.

In some examples, the filter generation system 102 may create an access control list for all provider edge system(s) 104 that are transceiving information for the particular customer. In other examples, the filter generation system 102 may generate multiple filters of different sizes and/or compositions for a single customer based on the particular provider edge system 104 to which it will be applied.

For example, the limitations of a first provider edge system 104 may require that an access control list not exceed three-thousand lines, while a second provider edge system 104 may be equipped to handle an access control list of five-thousand lines. The filter generation system may, in that instance, provide an access control list to the first provider edge system 104 that is shorter than that provided to the second provider edge system 104. Further, in examples, the second set of source-address prefixes used to generate the third set of source-address prefixes may be specific to traffic data received from a first provider edge system 104 (as opposed to a second provider edge system 104). Accordingly, the second set of source-address prefixes contained in traffic transceived by the first provider edge system 104 may be different from the second set of source-address prefixes contained in traffic transceived by a second provider edge system 104. As such, the third set of source-address prefixes (e.g., the access control list) may be different for different provider edge system(s) 104.

In examples, the filter generation system 102 may also perform one or more mitigation action(s) when an access control list reaches or approaches a maximum size. For example, the filter generation system 102 may receive information (e.g., periodically from each provider edge system 104) indicating a maximum access control list that can be accommodated by that provider edge system 104. In some examples, the filter generation system 102 may determine the maximum access control list size for a particular provider edge system 104 based on information regarding the type of equipment comprising the provider edge system 104. In examples a "maximum filter size" may be a configurable option. For example, the maximum filter size might be set on a per-router (or per-router-type) basis. In examples where a single access control list is maintained and distributed per customer for every provider edge system 104, the filter generation system may determine that the maximum size of the access control list equals the smallest maximum access control list size reported by any provider edge system 104. In other examples where the filter generation system 102 may maintain for a customer multiple access control lists for multiple provider edge system(s) 104, the filter generation system 102 may track a maximum access control list size for each provider edge system 104. In other examples, a global maximum access control list size may be programmed into the filter generation system 102.

In examples, if the filter generation system 102 determines that a maximum access control list size has been reached, it may perform a mitigation action. In examples, "reaching" a maximum access control list size may comprise reaching a threshold percentage of the maximum access control list size for one or more provider edge system(s) 104. For example, the mitigation action may be triggered with the applicable access control list size reaches, e.g., 90% of the size of access control list that can be accommodated by one or more provider edge system(s). In examples, the mitigation action may comprise, for example: (a) generating an alarm notification; (b) temporarily sending an empty or incomplete access control list; and/or (c) automatically pruning the access control list.

For example, the mitigation action may comprise the filter generation system 102 sending a signal to alarm system 112, which may generate an alarm notification (e.g., email, text, or other form of electronic communication) to alert an administrator that a maximum access control list size has been exceeded. In examples, this may allow the administrator to take action, such as pruning the access control list, swapping out equipment at the provider edge system(s) 104, or otherwise. In examples, the mitigation action may also comprise temporarily causing the access control list to not be applied at the provider edge system 104 and/or providing an empty access control list to the provider edge system 104.

In other examples, the mitigation action may comprise automatically pruning, by the filter generation system 102, the access control list in order to keep it within the maximum allowed size. For example, the filter generation system 102 may continue to add to an access control list any source-address prefixes that appear in both of the first set (from the route object) and from the second set (from the traffic data) until a maximum size for the access control list is reached.

Pruning may be done in a variety of manners. For example, the source-address prefixes on the access control list may be time stamped, e.g., based on the last received packet in the traffic data that included a particular source-address prefix. An access control list may continue to grow when it is periodically updated by the filter generation system 102 based on recent route object data and traffic data. The time stamp for a particular prefix may be updated based on the most recent packet referenced in the traffic data that included that prefix. If mitigation is needed, the filter generation system 102 may delete those prefixes from the access control list with the oldest time stamps. In other examples, the filter generation system 102 may prune an access control list based on a count or other statistic indicating a popularity of a particular source-address for the customer. Other pruning mechanisms are possible and contemplated.

Figure 3:
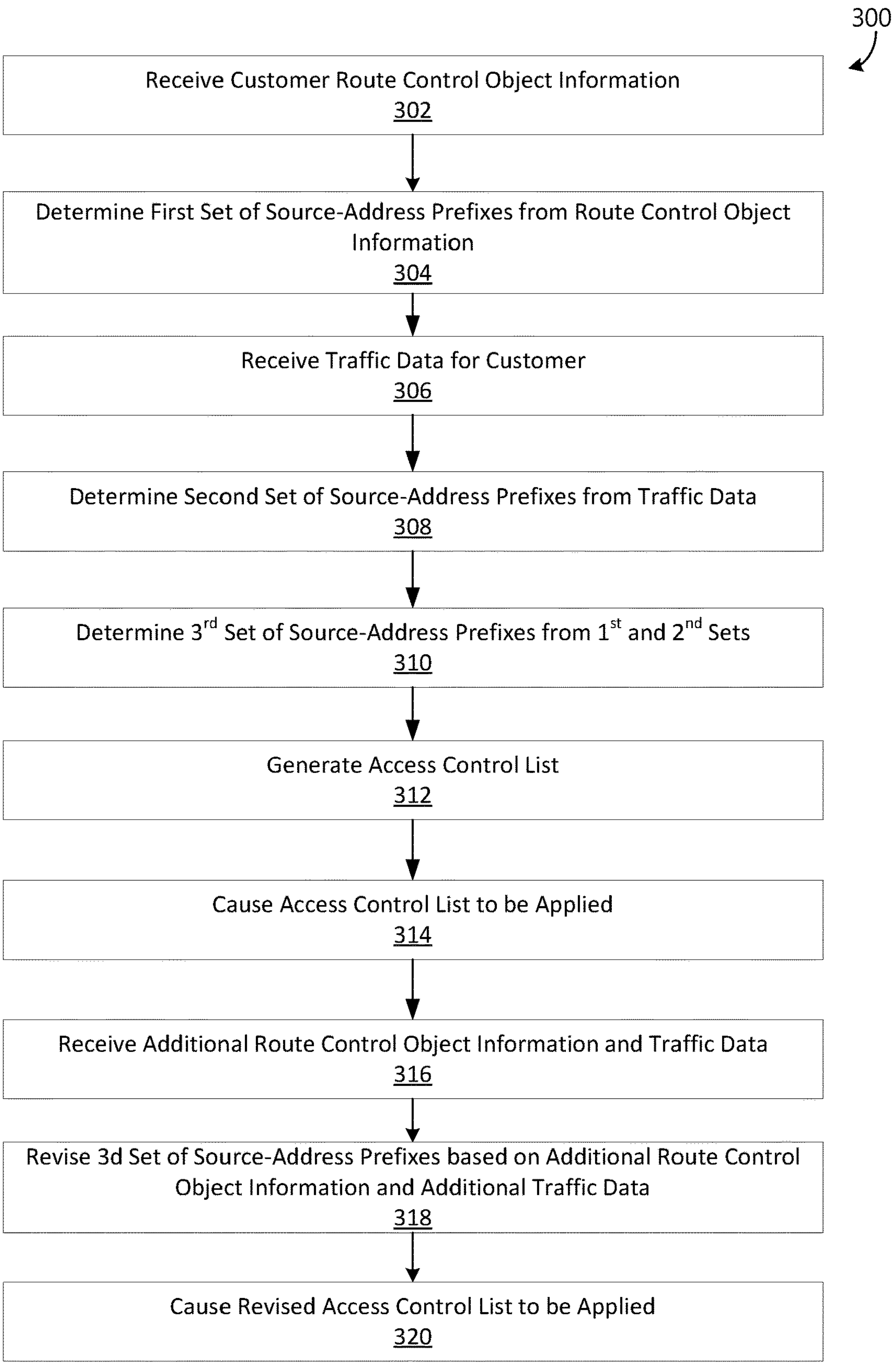
FIG. 3 depicts an example method according to aspects of the present application.

FIG. 3 depicts an example method 300. In examples, method 300 may be performed by a filter generation system, such as filter generation system 102. In examples, although the operations of method 300 are discussed in relation to a single customer, such operations may be performed for a first customer, a second customer, and/or a plurality of additional customers in series or in parallel. At operation 302, customer route object information is received. For example, filter generation system 102 may receive a route object, such as an IRR object, for a particular customer from IRR data system 110. In other examples, the filter generation system 102 may query the IRR data system 110 for route object information, such as all source-address prefixes referenced in the route object for a particular customer (or for a plurality of customers). As discussed, in examples, the IRR data system may store route objects for a plurality of customers of network 101. Each route object, in examples, may be specific to a customer.

At operation 304, a first set of source-address prefixes is determined from the route object information. For example, the filter-generation system 102 may extract a first set of source-address prefixes from a route object or from route object information returned in response to the query of the IRR data system 110. In examples, the first set of source-address prefixes may include all source-address prefixes contained in the route object for a particular customer.

At operation 306, traffic data may be received for the customer. For example, as discussed, the provider edge system(s) 104 may be instrumented to generate traffic data describing information about packets received for a customer at the provider edge system(s) 104. In examples, raw traffic data is collected by one or more traffic data collector system(s) 106, aggregated by one or more traffic data aggregation system(s) 108, and provided to filter generation system 102. In examples, the filter generation system 102 may store the traffic data one a per-customer basis, a per-customer-per-provider-edge-system basis, or otherwise.

At operation 308, a second set of source-address prefixes is determined from the traffic data. In examples, the filter generation system 102 may receive the second set of source-address prefixes from traffic data aggregator system 108. In other examples, the filter generation system 102 may extract the second set of source-address prefixes for the customer from traffic data provided by the traffic data aggregator system 108. As discussed, the traffic data for packets received at provider edge system(s) 104 may be identified as being for a particular customer based on being received on an interface 109 specific to the particular customer. Further, in examples, the filter generation system 102 may identify (or receive traffic data identifying) traffic from particular source-address prefixes as having been received at particular one of the provider edge system(s) 104. This may be useful if it is desired, for example, to implement multiple different filters for the same customer on different provider edge system(s) 104. In other cases, the second set of source-address prefixes may be a combined set for all traffic received for a particular customer, regardless of which provider edge system 104 received the traffic. In examples, the second set of source-address prefixes from the traffic data for the customer may be time-limited. For example, only source-address prefixes for traffic data received by a provider edge system 104 in the last hour, the last day, the last week, the last month, etc., may be used in deriving the second set of source-address prefixes. In other examples, the second set of source-address prefixes from the traffic data for the particular customer may be space-limited (e.g., only a certain number of source-address prefixes may be stored as a separate set, and source-address prefixes from older traffic are deleted when space is needed).

At operation 310, a third set of source-address prefixes is determined based on the first and second sets of source-address prefixes. For example, the filter generation system 102 may compare the first set of source-address prefixes and the second set of source-address prefixes and produce a third set of source-address prefixes including only those source-address prefixes that appear in both of the first set and the second set.

Flow proceeds to operation 312, where an access control list is generated. For example, the filter generation system 102 may then generate an access control list based on the third set of source-address prefixes. In some examples, the filter generation system 102 may create an access control list for all provider edge system(s) 104 that are transceiving information for the particular customer of network 101. In other examples, the filter generation system 102 may generate multiple filters of different sizes and/or compositions for the particular customer based on the particular provider edge system 104 to which it will be applied. For example, the limitations of a first provider edge system 104 may require that an access control list not exceed three-thousand lines, while a second provider edge system 104 may be equipped to handle an access control list of five-thousand lines. The filter generation system 102 may, in that instance, provide an access control list to the first provider edge system 104 that is shorter than that provided to the second provider edge system 104. Further, in examples, the second set of source-address prefixes used to generate the third set of source-address prefixes may be specific to traffic data received from a first provider edge system 104 (as opposed to a second provider edge system 104). Accordingly, the second set of source-address prefixes contained in traffic transceived by the first provider edge system 104 may be different from the second set of source-address prefixes contained in traffic transceived by a second provider edge system 104. As such, the third set of source-address prefixes (e.g., the access control list) may be different for different provider edge system(s) 104.

At operation 314, the access control list is caused to be applied. For example, the filter generation system 102 may distribute any applicable access control list(s) to provider edge system(s) 104 for application as an ingress filter. In examples, the router 105, filter device 107, or one or more other component(s) of provider edge system(s) 104 may apply the access control list to filter incoming traffic for the particular customer.

At operation 316, additional route object information and traffic data may be received. For example, the filter generation system 102 may periodically receive updated route object information from the IRR data system 110 and updated traffic data from traffic data aggregator system 108. The updated route object information from the IRR data system 110 may reflect edits to the customer's route object, and the updated traffic data from traffic data aggregator system 108 may reflect ongoing traffic that continues to be received for the customer at provider edge system(s) 104.

At operation 318, a revised third set of source-address prefixes may be determined based on the updated route object information from the IRR data system 110 and updated traffic data from traffic data aggregator system 108. In examples, operation 318 may also comprise determining if the first set of source-address prefixes or the second set of source-address prefixes has changed based on the updated route object information and/or the updated traffic data for the customer. In examples, changes to the first set or second set of source-address prefixes may cause a change to the third set of source-address prefixes based on the updated information. If the third-set of source address prefixes that is applicable to an access control list changes, then a revised access control list is generated based on the revised third set of source-address prefixes.

At operation 320, if a revised access control list is available, then it is caused to be applied. For example, the filter generation system 102 may distribute any revised, applicable access control list(s) to provider edge system(s) 104 for application as an ingress filter. In examples, the router 105, filter device 107, or one or more other component(s) of provider edge system(s) 104 may apply the revised access control list to filter traffic for the particular customer. In examples, the method 300 can be repeated for different customers of network 101, for different combinations of customer and provider edge system(s) 104 (if a different access control list will be distributed for the same customer at different provider edge system(s)), etc.

Figure 4:
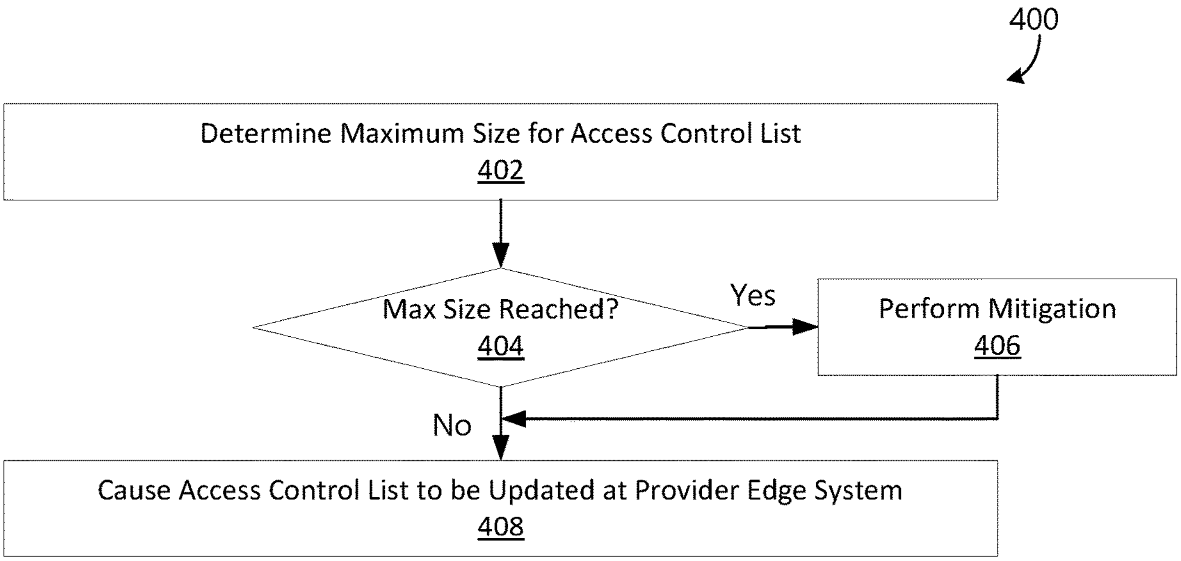
FIG. 4 depicts another example method according to aspects of the present application.

FIG. 4 depicts an example method 400. In examples, the operations of method 400 may be performed by the filter generation system 102. In addition, the operations of method 400 may, in examples, be part of the operations 312, 314, 318 and/or 320 of method 300.

At operation 402, a maximum size for an access control list may be determined. For example, the filter generation system 102 may receive information (e.g., periodically from each provider edge system 104) indicating a maximum access control list that can be accommodated by that provider edge system 104. In some examples, the filter generation system 102 may determine the maximum access control list size for a particular provider edge system 104 based on information regarding the type of equipment comprising the provider edge system 104. In examples where a single access control list is maintained and distributed per customer for every provider edge system 104, the filter generation system may determine that the maximum size of the access control list equals the smallest maximum access control list size reported by any provider edge system 104. In other examples where the filter generation system 102 may maintain for a customer multiple access control lists for multiple provider edge system(s) 104, the filter generation system 102 may track a maximum access control list size for each provider edge system 104. In other examples, a global maximum access control list size may be programmed into the filter generation system 102.

At operation 404, a determination is made whether the maximum size for a particular access control list has been reached. Determination operation 404 may, for example, be performed by filter generation system 102 when building an initial access control list for a customer (or for a customer and provider edge system combination) and/or when revising an access control list. In examples, "reaching" a maximum access control list size may comprise reaching a threshold percentage of the maximum access control list size for one or more provider edge system(s) 104. For example, the mitigation action may be triggered with the applicable access control list size reaches, e.g., 90% of the size of access control list that can be accommodated by one or more applicable provider edge system(s).

If a maximum access control list size has been reached, flow branches "yes" to operation 406, where a mitigation action is performed. For example, the mitigation action may comprise: (a) generating an alarm notification; (b) automatically pruning the access control list; and/or (c) temporarily causing the access control list to not be applied at the provider edge system(s) 104 and/or providing an empty access control list to the provider edge system(s) 104.

For example, the mitigation action may comprise the filter generation system 102 sending a signal to alarm system 112, which may generate an alarm notification (e.g., email, text, or other form of electronic communication) to alert an administrator that a maximum access control list size has been exceeded. In examples, this may allow the administrator to take action, such as pruning the access control list, swapping out equipment at the provider edge system(s) 104, or otherwise. In examples, mitigation action may also include temporarily causing the access control list to not be applied at the provider edge system(s) 104 and/or providing an empty access control list to the provider edge system(s) 104.

In other examples, the mitigation action may comprise automatically pruning, by the filter generation system 102, the access control list in order to keep it within the maximum allowed size. For example, as the route object information and traffic data continue to be updated, the filter generation system 102 may continue to add to an access control list any source-address prefixes that appear in both of the first set (from the route object) and from the second set (from the traffic data) until a maximum size for the access control list is reached.

Pruning may be done in a variety of manners. For example, the source-address prefixes on the access control list may be time stamped, e.g., based on the last received packet in the traffic data that included a particular source-address prefix. An access control list may continue to grow when it is periodically updated by the filter generation system 102 based on recent route object data and traffic data. The time stamp for a particular prefix may be updated based on the most recent packet referenced in the traffic data that included that prefix. If mitigation is needed, the filter generation system 102 may delete those prefixes from the access control list with the oldest time stamps. In other examples, the filter generation system 102 may prune an access control list based on a count or other statistic indicating a popularity of a particular source-address for the customer. Other pruning mechanisms are possible and contemplated.

If the maximum access control list size has not been reached, flow branches "no" to operation 408. Flow may also proceed from operation 406 to operation 408 (following implementation of a mitigation action). At operation 408, one or more access control list(s) may be caused to be updated at provider edge system(s) 104. For example, an updated access control list that does not exceed the maximum access control list size for the provider edge system(s) 104 may be delivered to the provider edge system(s) to be applied as an ingress filter. Or a pruned, empty, or incomplete access control list (as a result of a mitigation action) may be delivered to the provider edge system(s) to be applied as an ingress filter. In examples, the router 105, filter device 107, or one or more other component(s) of provider edge system(s) 104 may apply the revised access control list to filter traffic for the particular customer.

Figure 5:
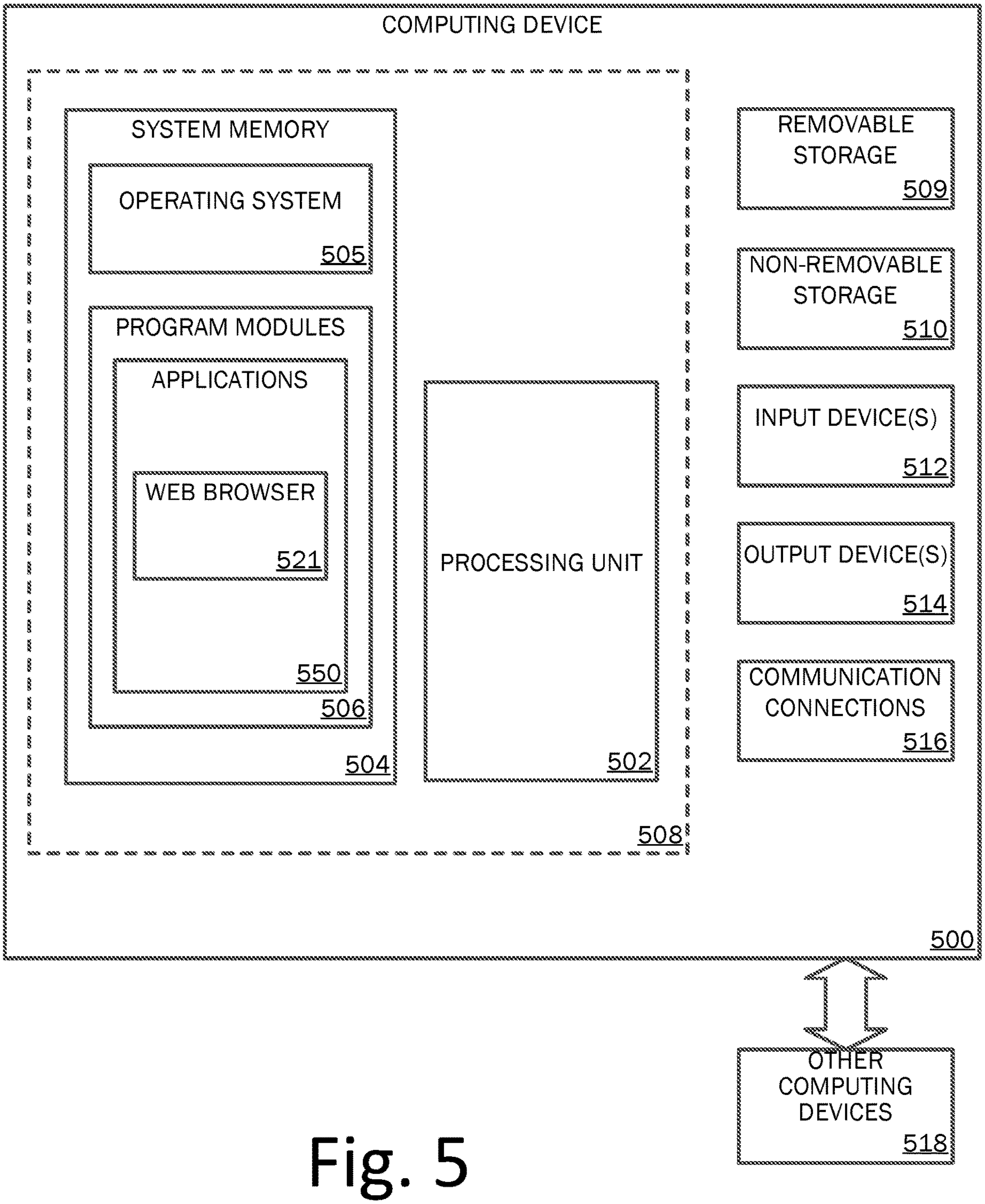
FIG. 5 depicts an exemplary computing environment in which aspects of the present application may be practiced.

FIG. 5 is a block diagram illustrating physical components (i.e., hardware) of a computing device 500 with which examples of the present disclosure may be practiced. The computing device components described below may be suitable for a computing device(s) implementing one or more of the filter generation system 102, provider edge system(s) 104, traffic data collector system(s) 106, traffic data aggregator system 108, IRR data system 110, alarm system 112, router 105, filter device 107, interface(s) 109, and/or server(s) 120, or other components of FIGS. 1 and 2. In a basic configuration, the computing device 500 may include at least one processing unit 502 and a system memory 504. The processing unit(s) (e.g., processors) may be referred to as a processing system. Depending on the configuration and type of computing device, the system memory 504 may comprise, but is not limited to, volatile storage (e.g., random access memory), nonvolatile storage (e.g., read-only memory), flash memory, or any combination of such memories. The system memory 504 may include an operating system 505 and one or more program modules 506 suitable for running software applications 550 to implement one or more of the systems described above with respect to FIGS. 1-2.

The operating system 505, for example, may be suitable for controlling the operation of the computing device 500. Furthermore, aspects of the invention may be practiced in conjunction with a graphics library, other operating systems, or any other application program and is not limited to any particular application or system. This basic configuration is illustrated in FIG. 5 by those components within a dashed line 508. The computing device 500 may have additional features or functionality. For example, the computing device 500 may also include additional data storage devices (removable and/or non-removable) such as, for example, magnetic disks, optical disks, or tape. Such additional storage is illustrated in FIG. 5 by a removable storage device 509 and a non-removable storage device 510.

As stated above, a number of program modules and data files may be stored in the system memory 504. While executing on the processing unit 502, the program modules 506 may perform processes including, but not limited to, one or more of the operations of the methods illustrated in FIGS. 3-4. Other program modules that may be used in accordance with examples of the present invention and may include applications such as electronic mail and contacts applications, word processing applications, spreadsheet applications, database applications, slide presentation applications, drawing or computer-aided application programs, etc.

Furthermore, examples of the invention may be practiced in an electrical circuit comprising discrete electronic elements, packaged or integrated electronic chips containing logic gates, a circuit utilizing a microprocessor, or on a single chip containing electronic elements or microprocessors. For example, examples of the invention may be practiced via a system-on-a-chip (SOC) where each or many of the components illustrated in FIG. 5 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to generating suggested queries, may be operated via application-specific logic integrated with other components of the computing device 500 on the single integrated circuit (chip). Examples of the present disclosure may also be practiced using other technologies capable of performing logical operations such as, for example, AND, OR, and NOT, including but not limited to mechanical, optical, fluidic, and quantum technologies.

The computing device 500 may also have one or more input device(s) 512 such as a keyboard, a mouse, a pen, a sound input device, a touch input device, etc. The output device(s) 514 such as a display, speakers, a printer, etc. may also be included. The aforementioned devices are examples and others may be used. The computing device 500 may include one or more communication connections 516 allowing communications with other computing devices 518. Examples of suitable communication connections 516 include, but are not limited to, RF transmitter, receiver, and/or transceiver circuitry; universal serial bus (USB), parallel, and/or serial ports. In examples, communications connections 516 may also include any necessary electrical networks between and among components of the presently described systems.

The term computer readable media as used herein may include computer storage media. Computer storage media may include volatile and nonvolatile, removable and non-removable media implemented in any method or technology for storage of information, such as computer readable instructions, data structures, or program modules. The system memory 504, the removable storage device 509, and the non-removable storage device 510 are all computer storage media examples (i.e., memory storage.) Computer storage media may include RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 500. Any such computer storage media may be part of the computing device 500. Computer storage media may be non-transitory and tangible and does not include a carrier wave or other propagated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Aspects of the present invention, for example, are described above with reference to block diagrams and/or operational illustrations of methods, systems, and computer program products according to aspects of the invention. Systems depicted as blocks may be communicatively connected to one or more other systems described, whether or not such connection(s) is/are drawn as such. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved. Further, as used herein and in the claims, the phrase "at least one of element A, element B, or element C" is intended to convey any of: element A, element B, element C, elements A and B, elements A and C, elements B and C, and elements A, B, and C.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively rearranged, included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A method, comprising:
receiving, by a filter generation system, route object information;
determining, by the filter generation system and from the route object information, a first set of permitted source-address prefixes for a customer;
receiving, by the filter generation system, traffic data for packets of network traffic received for the customer at a first provider edge system;
determining, by the filter generation system, a second set of source-address prefixes from the received traffic data;
determining, by the filter generation system, a third set of source-address prefixes that are in both the first set and the second set;
generating, by the filter generation system, an access control list based on the third set of source-address prefixes; and
causing, by the filter generation system, the access control list to be applied at the first provider edge system.

2. The method of claim 1, further comprising:

determining a maximum size for the access control list based on a capacity of the first provider edge system; and when the third set of source-address prefixes reaches the maximum size, performing a mitigation action.

3. The method of claim 2, wherein the mitigation action comprises at least one of:

generating an alarm notification; or causing the access control list to be pruned automatically to be smaller than the third set of source-address prefixes and smaller than the maximum size.

4. The method of claim 1, further comprising:

receiving second traffic data for packets of network traffic received at a second provider edge system for the customer;

determining a fourth set of source-address prefixes from the received second traffic data;

determining a fifth set of source-address prefixes that are in both the first set and the fourth set;

generating a second access control list based on the fifth set of source-address prefixes; and causing the second access control list to be applied at the second provider edge system.

5. The method of claim 1, further comprising:

receiving second traffic data for packets of network traffic received at a second provider edge system for the customer;

determining a fourth set of source-address prefixes from the received second traffic data;

determining a fifth set of source-address prefixes that are in both the first set and in at least one of the second set or the fourth set;

generating a second access control list based on the fifth set of source-address prefixes; and causing the second access control list to be applied at both the first provider edge system and the second provider edge system.

6. The method of claim 1, further comprising:

receiving additional traffic data for packets of network traffic received at the first interface of the first provider edge system for the customer;

amending the second set of source-address prefixes from the received additional traffic data;

revising the third set of source-address prefixes based on the first set and the revised second set;

generating a revised access control list based on the revised third set of source-address prefixes; and causing the revised access control list to be applied at the first provider edge system.

7. The method of claim 1, wherein the first provider edge system comprises a first provider router device.

8. The method of claim 1, wherein the network traffic is received on a first interface of the first provider edge system, and wherein the access control list is applied to network traffic on the first interface.

9. A system, comprising:

at least one processor; and memory, operatively connected to the at least one processor and storing instructions that, when executed by the at least one processor, cause the system to perform a method, the method comprising:

receiving route object information;

determining, from the route object information, a first set of permitted source-address prefixes for a customer;

receiving traffic data for packets of network traffic received for the customer at a first provider edge system;

determining a second set of source-address prefixes from the received traffic data;

determining a third set of source-address prefixes that are in both the first set and the second set;

generating an access control list based on the third set of source-address prefixes; and causing the access control list to be applied at the first provider edge system.

10. The system of claim 9, wherein the method further comprises:

determining a maximum size for the access control list based on a capacity of the first provider edge system; and when the third set of source-address prefixes reaches the maximum size, performing a mitigation action.

11. The system of claim 10, wherein the mitigation action comprises at least one of:

generating an alarm notification; or causing the access control list to be pruned automatically to be smaller than the third set of source-address prefixes and smaller than the maximum size.

12. The system of claim 9, wherein the method further comprises:

receiving second traffic data for packets of network traffic received at a second provider edge system for the customer;

determining a fourth set of source-address prefixes from the received second traffic data;

determining a fifth set of source-address prefixes that are in both the first set and the fourth set;

generating a second access control list based on the fifth set of source-address prefixes; and causing the second access control list to be applied at the second provider edge system.

13. The system of claim 9, wherein the method further comprises:

receiving second traffic data for packets of network traffic received at a second provider edge system for the customer;

determining a fourth set of source-address prefixes from the received second traffic data;

determining a fifth set of source-address prefixes that are in both the first set and in at least one of the second set or the fourth set;

generating a second access control list based on the fifth set of source-address prefixes; and causing the second access control list to be applied at both the first provider edge system and the second provider edge system.

14. The system of claim 9, wherein the method further comprises:

receiving additional traffic data for packets of network traffic received at the first interface of the first provider edge system for the customer;

amending the second set of source-address prefixes from the received additional traffic data;

revising the third set of source-address prefixes based on the first set and the revised second set;

generating a revised access control list based on the revised third set of source-address prefixes; and causing the revised access control list to be applied at the first provider edge system.

15. The system of claim 9, wherein the first provider edge system comprises a first provider router device.

16. The system of claim 9, wherein the network traffic is received on a first interface of the first provider edge system, and wherein the access control list is applied to network traffic on the first interface.

17. A system, comprising:

at least one processor; and memory, operatively connected to the at least one processor and storing instructions that, when executed by the at least one processor, cause the system to perform a method, the method comprising:

receiving route object information;

determining, from the route object information, a first set of permitted source-address prefixes for a customer;

receiving traffic data for packets of network traffic received for the customer at a first provider edge system;

determining a second set of source-address prefixes from the received traffic data;

determining a third set of source-address prefixes that are in both the first set and the second set;

generating a first access control list based on the third set of source-address prefixes;

causing the first access control list to be applied at the first provider edge system;

receiving second traffic data for packets of network traffic received at a second provider edge system for the customer;

determining a fourth set of source-address prefixes from the received second traffic data;

determining a fifth set of source-address prefixes that are in both the first set and the fourth set;

generating a second access control list based on the fifth set of source-address prefixes; and causing the second access control list to be applied at the second provider edge system.

18. The system of claim 17, wherein the method further comprises:

determining a maximum size for the first access control list based on a capacity of the first provider edge system; and when the third set of source-address prefixes reaches the maximum size, performing a mitigation action.

19. The system of claim 18, wherein the mitigation action comprises at least one of:

generating an alarm notification; or causing the first access control list to be pruned automatically to be smaller than the third set of source-address prefixes and smaller than the maximum size.

20. The system of claim 17, wherein the method further comprises:

receiving additional traffic data for packets of network traffic received at the first interface of the first provider edge system for the customer;

amending the second set of source-address prefixes from the received additional traffic data;

revising the third set of source-address prefixes based on the first set and the revised second set;

generating a revised first access control list based on the revised third set of source-address prefixes; and causing the revised first access control list to be applied at the first provider edge system.

* * * * *